United States Patent
Boland

(10) Patent No.: US 10,328,903 B2
(45) Date of Patent: Jun. 25, 2019

(54) WINDSCREEN WIPER DEVICE

(71) Applicant: Xavier Boland, Arlong (BE)

(72) Inventor: Xavier Boland, Arlong (BE)

(73) Assignee: Trico Belgium, Aubange (BE)

(*) Notice: Subject to any disclaimer, the term of this patent is extended or adjusted under 35 U.S.C. 154(b) by 304 days.

(21) Appl. No.: 15/263,660

(22) Filed: Sep. 13, 2016

(65) Prior Publication Data

US 2017/0096126 A1    Apr. 6, 2017

Related U.S. Application Data

(63) Continuation of application No. 14/111,637, filed as application No. PCT/EP2011/055841 on Apr. 13, 2011, now Pat. No. 9,566,949.

(51) Int. Cl.
B60S 1/38    (2006.01)

(52) U.S. Cl.
CPC ............ *B60S 1/3879* (2013.01); *B60S 1/381* (2013.01); *B60S 1/3889* (2013.01); *B60S 1/3893* (2013.01); *B60S 2001/3898* (2013.01); *Y10T 29/49947* (2015.01)

(58) Field of Classification Search
CPC .... B60S 1/3889; B60S 1/3893; B60S 1/3891; B60S 1/3858; B60S 1/3879
See application file for complete search history.

(56) References Cited

U.S. PATENT DOCUMENTS

2010/0058552 A1* 3/2010 Coos ..................... B60S 1/38
                                                          15/250.3

FOREIGN PATENT DOCUMENTS

WO    WO 0242129 A1 * 5/2002 ............... B60S 1/38

OTHER PUBLICATIONS

WO0242129A1 (machine translation), 2002.*

* cited by examiner

*Primary Examiner* — Andrew A Horton
(74) *Attorney, Agent, or Firm* — Miller Canfield

(57) ABSTRACT

A windscreen wiper device includes an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed. Neighboring ends of the longitudinal strips are interconnected respective connecting pieces. The connecting piece comprises engaging members engaging around the longitudinal strips, wherein the strips and the connecting piece are slidably connected by means of a snap connection. At least one pin extending in a direction perpendicular to the windscreen to be wiped engages the wiper blade at a location of a hole in one of the longitudinal strips to block longitudinal movement of the wiper blade relative to the strip in a longitudinal direction thereof away from the connecting piece.

12 Claims, 8 Drawing Sheets

WINDSCREEN WIPER DEVICE

CROSS-REFERENCE TO PRIOR APPLICATIONS

This U.S. Continuation Patent Application claims the benefit of U.S. National Stage patent application Ser. No. 14/111,637 filed Dec. 9, 2013 which claims the benefit from PCT International Patent Application Serial No. PCT/EP2011/055841 filed Apr. 13, 2011, the entire disclosures of the applications being considered part of the disclosure of this application and hereby incorporated by reference.

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating wiper arm, wherein at least one connecting piece comprises engaging members engaging around the longitudinal strips so that the strips are mounted in grooves formed by the engaging members, wherein the strips and the connecting piece are slidably connected by means of a snap connection.

2. Related Art

Such a windscreen wiper device is known from European patent publication no. 1 491 416 of the same Applicant. The prior art windscreen wiper device, like the windshield wiper device of the invention, is designed as a "flat blade" or "yokeless blade", wherein use is no longer made of several yokes pivotally connected to each other, but wherein the wiper blade is biassed by the carrier element, as a result of which it exhibits a specific curvature. In practice it is felt that, although the neighbouring ends of the longitudinal strips and the connecting pieces (in practice also called "end caps") of the prior art windscreen wiper device are connected in a durable, solid manner, the position of the wiper blade between the end caps thereof could be better controlled. Indeed, the tolerance of the rubber material of the wiper blade is a few millimeters and the design of the end caps leaves a space of also a few millimeters.

SUMMARY OF THE INVENTION

The object of the invention is to improve the prior art as indicated above, in particular to provide a windscreen wiper device, wherein the longitudinal strips and the connecting pieces ("end caps") are interconnected in a durable, solid manner, and wherein the position of the wiper blade is better defined.

In order to accomplish that objective, a windscreen wiper device of the kind referred to in the introduction is characterized according to the invention in that at least one pin extending in a direction perpendicular to the windscreen to be wiped engages the wiper blade at a location of a hole in one of the longitudinal strips wherein the pin is arranged to block a longitudinal movement of the wiper blade relative to the strip in a longitudinal direction thereof away from the connecting piece. Accordingly, the wiper blade is not allowed to move in at least one longitudinal direction with respect to the strip.

Particularly, both a moulding operation or an extrusion operation would ensure that the wiper blade can be formed in a reliable and controllable manner, without high costs as far as additional tools and equipment are concerned.

Preferably, the hole has a closed circumference. In the alternative, the hole has an open circumference. In the latter case, the hole forms a recess. In particular, the snap connection comprises laterally extending means on the strips, wherein the laterally extending means comprise at least one protrusion extending laterally from an interior edge of each strip, the protrusion being located within the outer contour of each strip and between stops on the connecting piece, wherein the recess is formed within the outer contour of the strip by the protrusion and the interior edge of the strip.

In one preferred embodiment of a windscreen wiper device in accordance with the invention the hole has an at least substantially U-shaped cross-section, wherein the pin is arranged to block a longitudinal movement of the wiper blade relative to the strip in a longitudinal direction thereof towards the connecting piece and away from the connecting piece. Hence, opposite longitudinal movements of the wiper blade vis-a-vis the strip are blocked. In another preferred embodiment of a windscreen wiper device according to the invention the pin engages into the wiper blade at a location of a bottom of the groove accommodating the strip. Preferably, the pin is a separate constructional element.

In another preferred embodiment of a windscreen wiper device in accordance with the invention at least two pins are provided, wherein the pins are arranged to block a longitudinal movement of the wiper blade to the strips. In other words, a first pin is arranged to block a longitudinal movement of the wiper blade relative to one strip (away from the connecting piece or away from the connecting piece and towards the connecting piece), whereas the second pin is arranged to block a longitudinal movement of the wiper blade relative to the other strip (again away from the connecting piece or away from the connecting piece and towards the connecting piece).

In another preferred embodiment of a windscreen wiper device according to the invention the pins are separate constructional elements. In another preferred embodiment of a windscreen wiper device in accordance with the invention the pins forming one separate constructional element are interconnected by a transverse bridge. Particularly, the pins and the transverse bridge are in one piece. More in particular, the one separate constructional element is U-shaped (i.e., in the form of a staple), wherein the separate constructional element having the U-shape is held by the connecting piece. In other words, the connecting piece keeps the U-shaped separate constructional element in place and thus secures it.

The invention furthermore relates to a method for manufacturing a windscreen wiper device in accordance with the invention, wherein opposing longitudinal grooves are formed in the longitudinal sides of an elongate wiper blade of a flexible material, which can be placed in abutment with a windscreen to be wiped, in which grooves longitudinal strips of a carrier element are subsequently fitted in spaced-apart relationship, wherein neighbouring ends of the longitudinal strips are interconnected by a respective connecting piece, wherein a connecting device is provided for an oscillating wiper arm, wherein the strips at least one connecting piece are slidably connected by means of a snap connection, wherein engaging members of the connecting piece engage around the longitudinal strips, so that the strips are mounted in grooves formed by the engaging members, characterized in that use is made of at least one pin extending in a direction perpendicular to the windscreen to be wiped, the pin engaging the wiper blade at a location of a hole in one of the longitudinal strips formed, wherein the pin is arranged to block a longitudinal movement of the wiper blade relative to the strip in a longitudinal direction thereof away from the connecting piece.

THE DRAWINGS

The invention will now be explained in more detail with reference to figures illustrated in a drawing, wherein.

DETAILED DESCRIPTION

Figure 1:
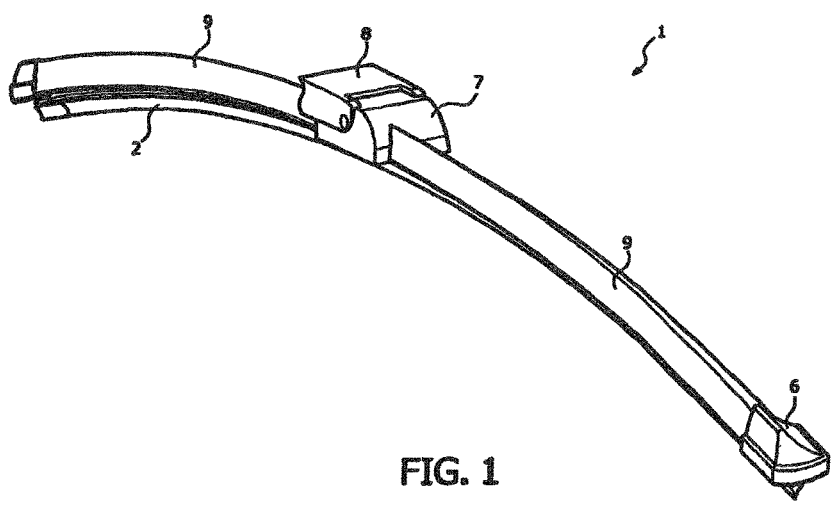
FIG. 1 is a perspective, schematic view of a preferred embodiment of a windscreen wiper device according to the invention.
Figure 2:
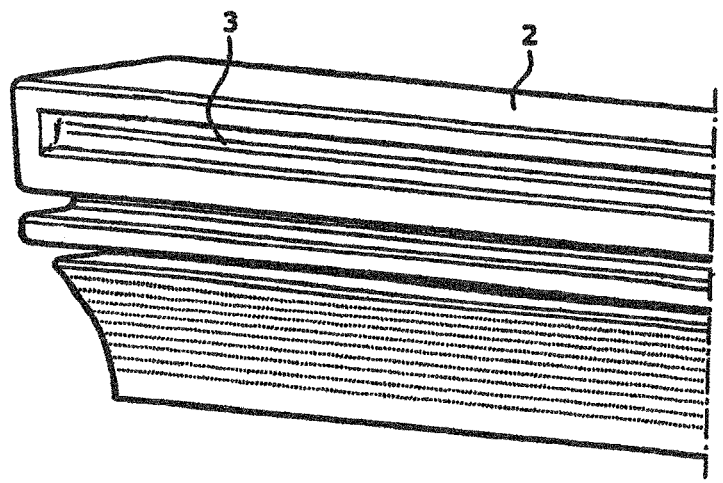
FIG. 2 is an enlarged, fragmentary perspective view of an end portion of the wiper blade.
Figure 4A:
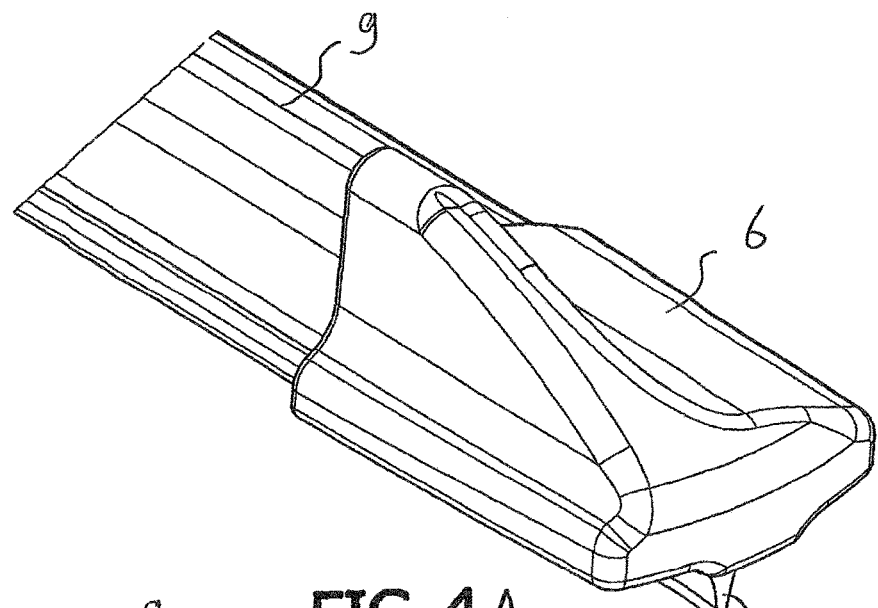
FIGS. 4A and 4B are enlarged, fragmentary top perspective views showing alternative embodiments of connecting pieces assembled with the wiper blade end strips.
Figure 4B:
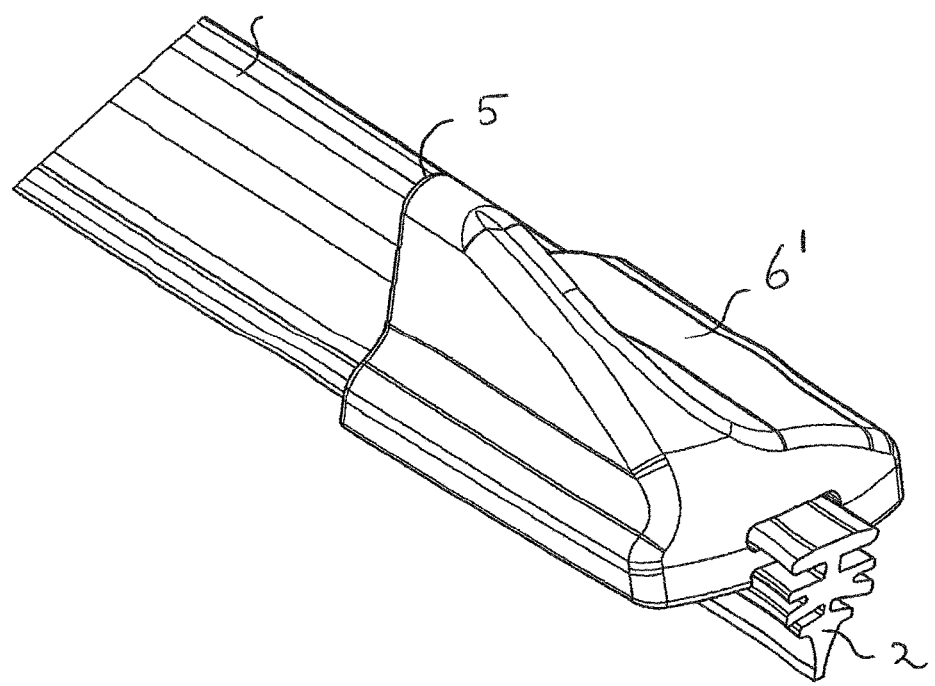
Figure 5A:
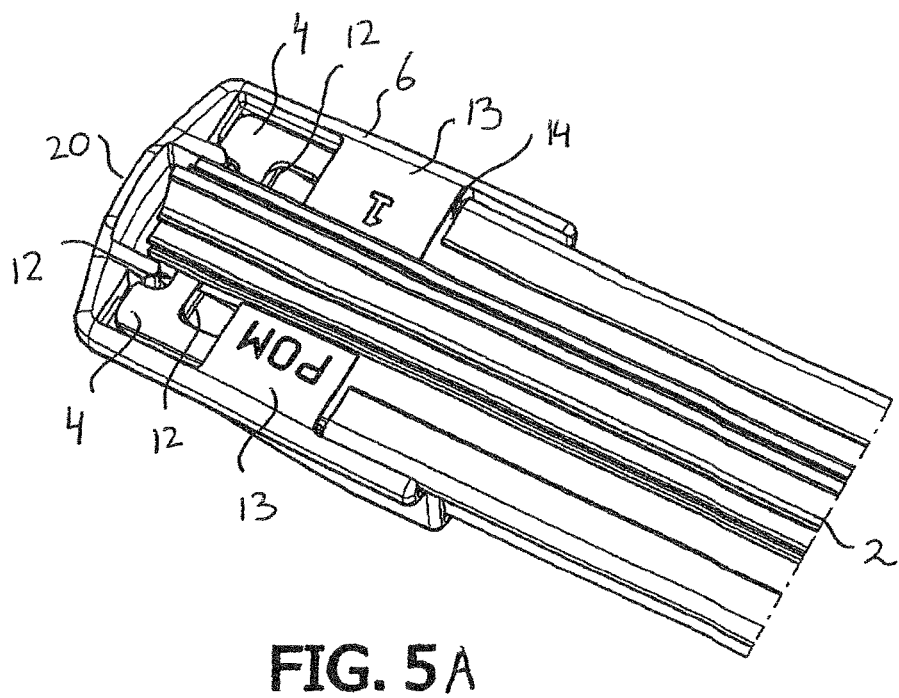
FIGS. 5A and 5B are bottom views corresponding to those of FIGS. 4A and 4B, respectively.
Figure 5B:
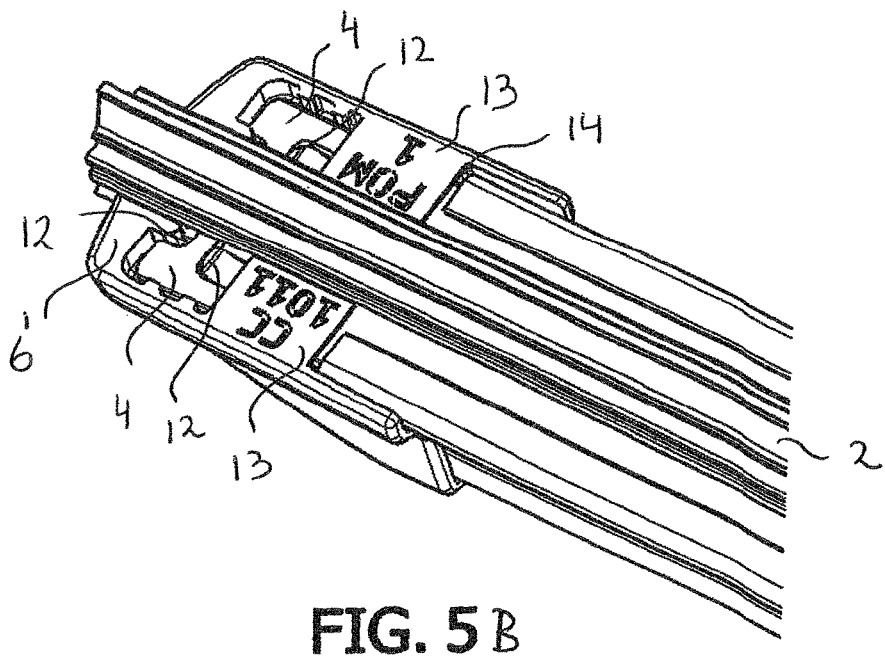

FIG. 1 shows a preferred variant of a windscreen wiper device 1 according to the invention, the windscreen wiper device is built up of an elastomeric wiper blade 2 (FIG. 2), in the longitudinal sides of which opposing longitudinal grooves 3 are formed, and of longitudinal strips 4 made of spring band steel (FIG. 3), which are fitted in the longitudinal grooves 3. The strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device by means of plastic connecting pieces 6 being separate constructional elements. The windscreen wiper device 1 is further equipped with a connecting device 7 for an oscillating arm 8, and a spoiler 9. FIG. 4A shows a free end of the windscreen wiper device 1 of FIG. 1, whereas FIG. 5A reveals a bottom view of the free end with the wiper blade 2 being present. FIGS. 4A and 5A show only one free end of the windscreen wiper device (1) 1, as the rubber retention is only on one end of the windscreen wiper device 1, so that the rubber on the other end thereof can slide freely. FIG. 4B and FIG. 5B correspond to FIGS. 4A and 5A, respectively, but now relating to a preferred embodiment, wherein the wiper blade 2 permanently extends beyond the connecting piece 6, i.e., sticks out through an opening in an end wall thereof in order to avoid contact between the connecting piece 6 and an A-pillar of a car, for example. Corresponding parts have been designated with the same reference numerals.

Figure 3A:
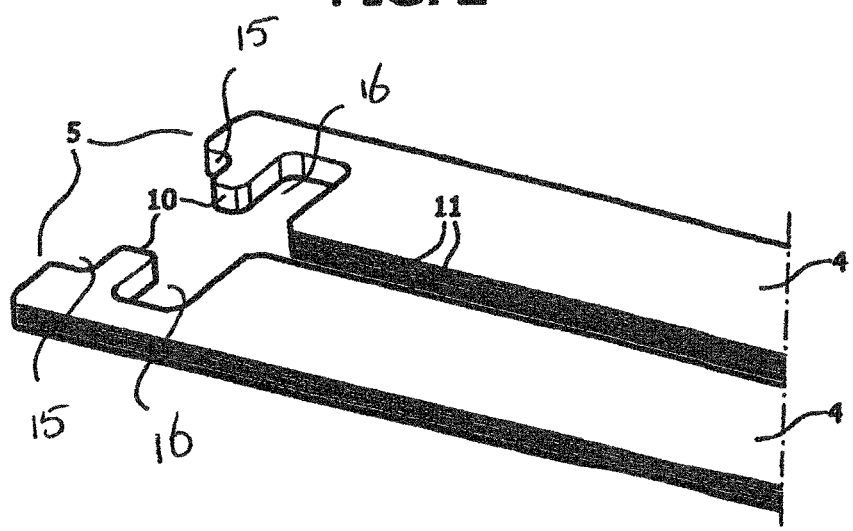
FIGS. 3A and 3B are enlarged, fragmentary perspective views of alternative embodiments of longitudinal strips.
Figure 3B:
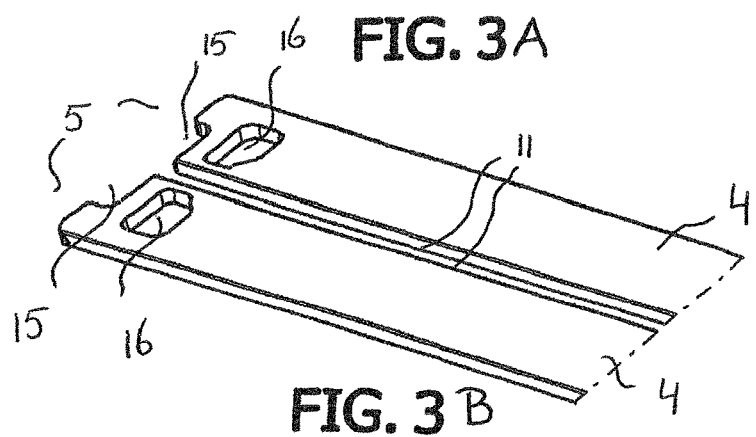
Figure 7:
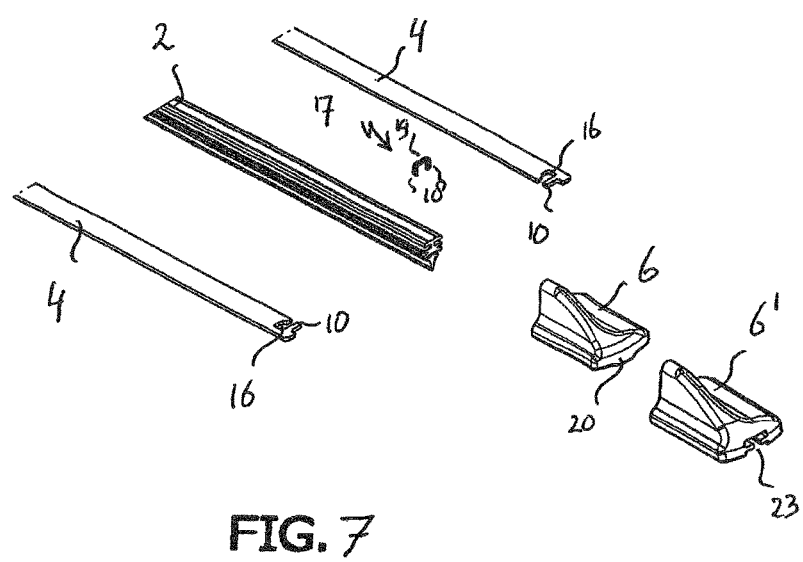
FIG. 7 is an exploded view of parts of the windscreen wiper device of FIG. 1, including a staple-like constructional element of the invention.

With reference to FIG. 3A relating to atop view of the strips 4 as such, the strips 4 are each provided with a protrusion 10 extending laterally from a longitudinal interior edge 11 of the strips 4. When a connecting piece 6 is slidably mounted onto the neighbouring ends 5 of the strips 4, a snap or clicking connection is realized, wherein the protrusions 10 are snapped or clicked between stops 12 ("notches 12") inside the connecting piece 6. Each protrusion 10 rests in a small groove between these opposing stops 12. Accordingly, the strips 4 are blocked against any movement in longitudinal direction with respect to the connecting pieces 6. Each connecting piece 6 is also provided with two engaging members 13 made integral therewith, wherein the engaging members 13 engage around the strips 4 so as to form a groove 14 for sliding the strips 4 therein. The engaging members 13 ensure that the strips 4 are blocked against any movement in transversal direction with respect to the connecting pieces 6. Each connecting piece 6 has a cavity to accommodate the free end of the spoiler 9. The stop 12 facing away from the free end of the connecting piece 6 is equipped with an inclined upper surface, so that sliding the connecting piece 6 onto the strips 4 does not take too much force, whereas once the protrusion 10 rests inside the groove dismounting the connecting piece 6 from the strips 4 cannot take place easily. The stop 12 facing towards the free end of the connecting piece 6 also ensures that the strips 4 are kept at a mutual constant distance, as the upper end of each strip 4 is located between the stop 12 and a (side) wall of the connecting piece 6. Still referring to FIG. 3A, the protrusion 10 and the interior edge 11 of each strip 4 define a first recess 15 at the outer end thereof, as well as a second recess 16. In case a separate constructional element 17 according to the invention, as shown in FIG. 7, having a U-shape with legs or pins 18 and a base or transverse bridge 19 is mounted inside the connecting piece 6, such that each pin 18 reaches through the first recess 15 of a respective strip 4 inside a bottom of a respective groove 3 of the wiper blade 2, then the wiper blade 2 would be blocked relative to the strips 4 against a longitudinal movement away from (the end wall 20 of) the connecting piece 6. Any longitudinal movement of the wiper blade 2 vis-a-vis the strips 4 in a direction towards the end wall is then blocked by the end wall 20. In other words, the extremity of the wiper blade 2 comes in contact with the end wall 20 of connecting piece 6. Alternatively, in case a separate constructional element 17 according to the invention, as shown in FIG. 7, having a U-shape with the legs or pins 18 and the base or transverse bridge 19 is mounted inside the connecting piece 6, such that each pin 18 reaches through the second recess 16 of a respective strip 4 inside a bottom of a respective groove 3 of the wiper blade 2, then the wiper blade 2 would be blocked relative to the strips 4 against a longitudinal movement both away from (the end wall 20) a towards (the end wall 20) of the connecting piece 6. In case of recess 16 or hole 16 both embodiments of FIG. 4A and FIG. 4B can be used. FIG. 3B corresponds to FIG. 3A, but now relating to a preferred embodiment, wherein a hole 16 with a closed circumference is present in both strips 4. Corresponding parts have been designated with the same reference numerals.

Figure 6A:
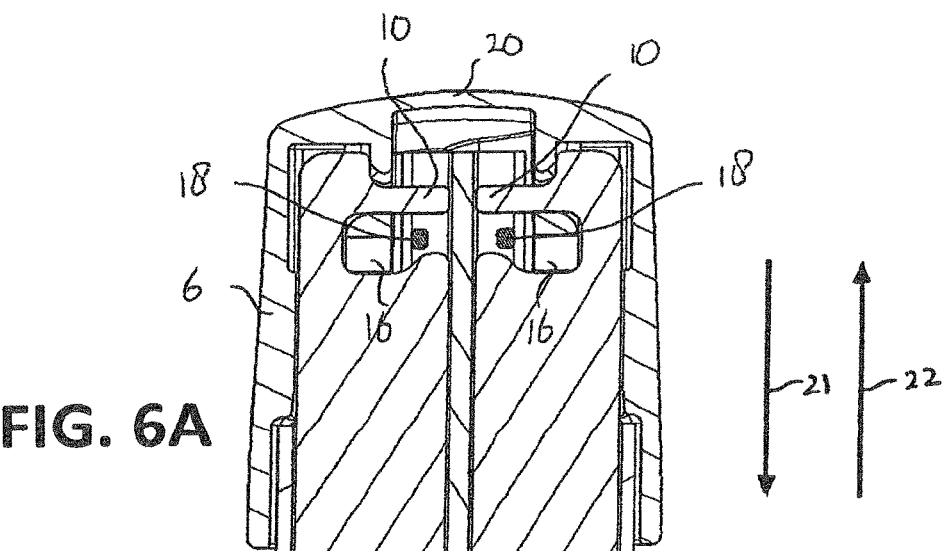
FIGS. 6A and 6B are enlarged, fragmentary, cross-sectional bottom views of alternative embodiments of wiper devices.
Figure 6B:
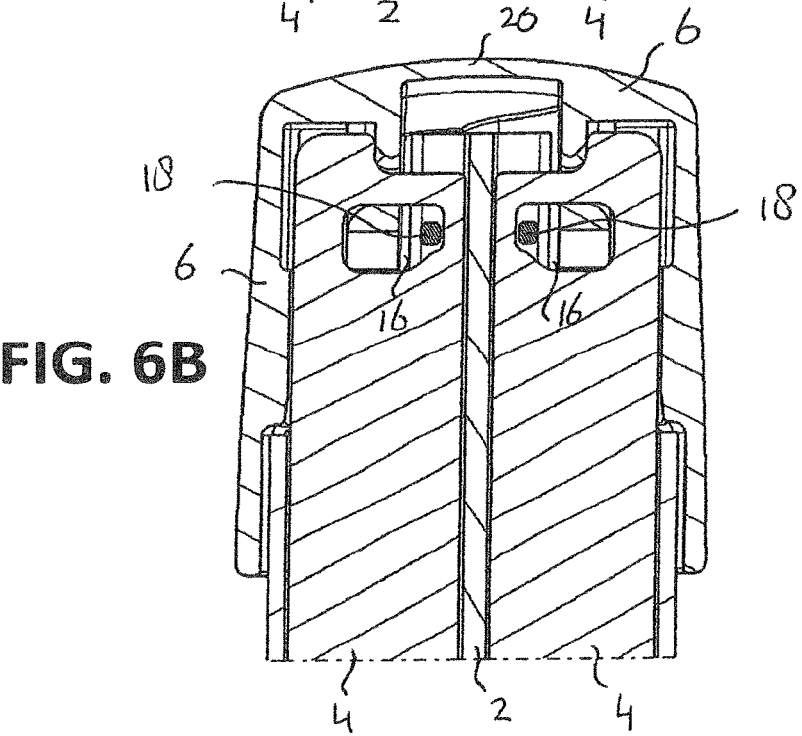

As can be seen from FIGS. 6a and 6b, the recesses/holes 16 of the strips 4 each comprise a pin 18 of the U-shaped constructional element 17 for blocking relative longitudinal movements of the wiper blade (2) vis-a-vis the strips 4 in the direction of the arrows 21 and 22. FIG. 7 is an exploded view of a free end of the windscreen wiper device 1 showing the wiper blade 2, the longitudinal strips 4, the staple-like constructional element 17 having two pins 18 and a base 19 all in one piece, as well as a connecting piece 6 or "end cap". FIG. 7 shows two types of end caps, as the present invention can be used for these two types of end caps, namely an end cap with an end wall 20 (also called a closed end cap of FIG. 4A) designated with reference numeral 6, and an end cap with an opening 23 (also called an open end cap of FIG. 4B) designated with reference numeral 6', so that the wiper blade 2 may stick out beyond the end cap 6', through the opening 23, whether or not permanently.

Figure 8:
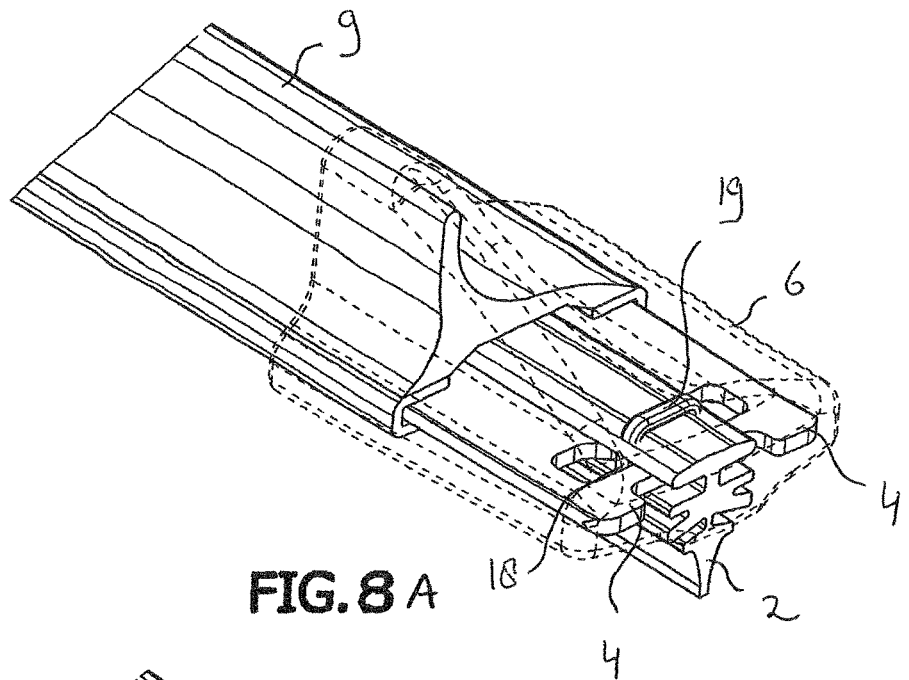
FIGS. 8A and 8B show a free end of the windscreen wiper device of FIG. 1 according to preferred embodiments, with the connecting piece taken away, elucidating the function of the staple-like constructional element of FIG. 7.
Figure 8:
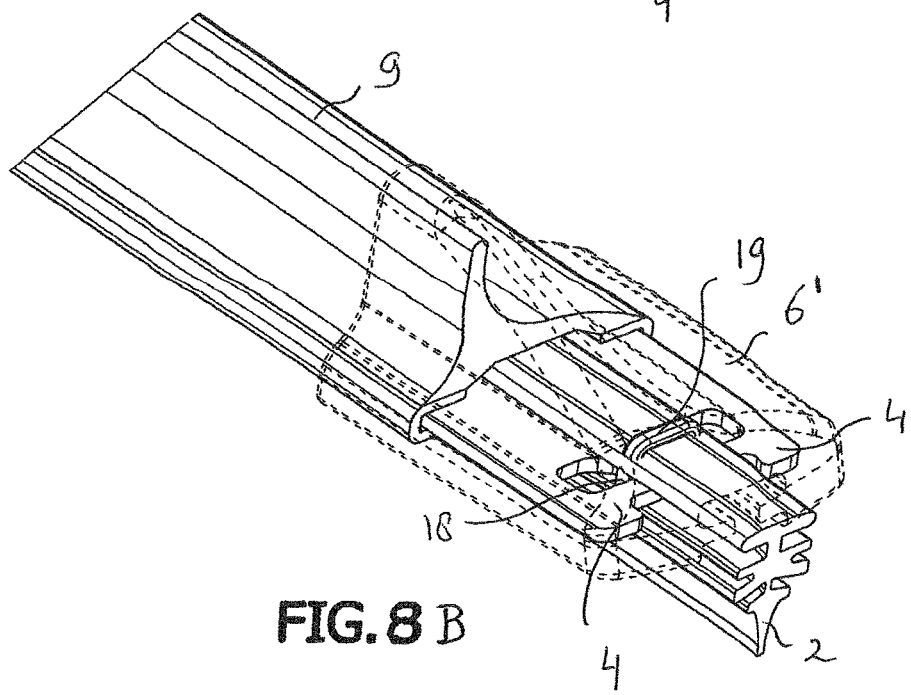
Figure 9:
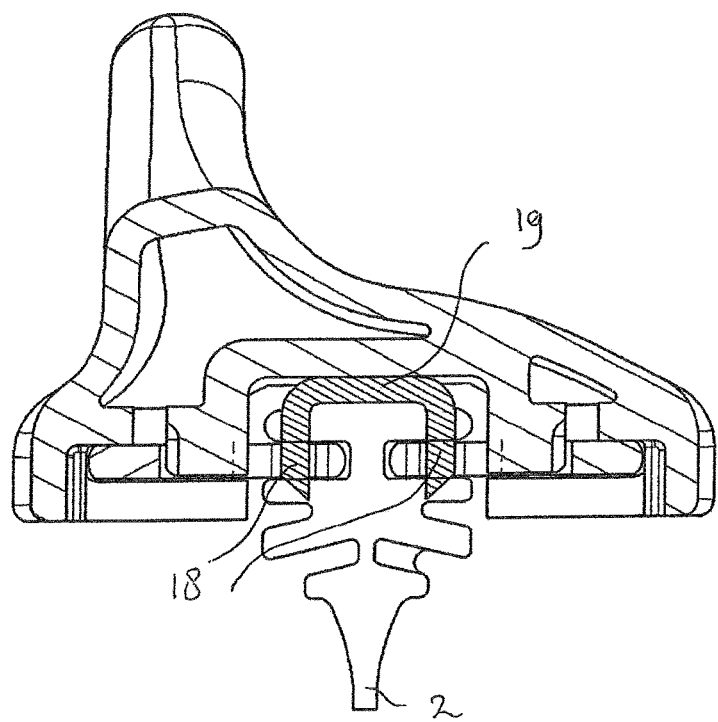
FIG. 9 is a cross-sectional view of FIG. 8.

FIG. 8 shows more in detail how the constructional element 17 is mounted, namely that the base 19 thereof is located on top of the wiper blade 2, while the pins 18 thereof are stamped through the flexible material of the wiper blade 2 into the recesses 16, as shown in FIG. 6. In both embodiments of FIGS. 8A and 8B corresponding with FIGS. 4A, 5A and 4B, 5B, respectively, the connecting pieces 6, 6 are depicted in dashed lines. FIG. 9 shows a cross-sectional view of FIG. 8, wherein corresponding parts have been designated with the same reference numerals.

The present invention is not limited to the embodiment shown, but extends also to other embodiments falling within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, said grooves being spaced below a top portion of said wiper blade, in which grooves spaced-apart longitudinal strips of the carrier element are disposed, wherein neighbouring ends of said longitudinal strips are interconnected by connecting pieces, which windscreen wiper device comprises a connecting device for an oscillating wiper arm, wherein said connecting pieces are made as separate pieces and are spaced longitudinally from said connecting device and comprise engaging members engaging around the longitudinal strips, so that said strips are mounted in grooves formed by said engaging members, wherein said strips and said connecting pieces are slidably connected by means of a snap connection, wherein pins extend in a direction perpendicular to the windscreen to be wiped through said top portion of said wiper blade and through a hole in one of said longitudinal strips and engage into said wiper blade at a location of a bottom of said groove accommodating said strip, wherein said pins are arranged to block a longitudinal movement of said wiper blade relative to said strip in a longitudinal direction thereof away from said connecting pieces, and wherein said pins are located adjacent terminal ends of said elongated wiper blade, and wherein said pins are separate constructional elements.

2. A windscreen wiper device according to claim 1, wherein said hole has a closed or open circumference.

3. A windscreen wiper device according to claim 1, wherein at least one protrusion extends laterally from an interior edge of each strip, said protrusion being located within the outer contour of each strip and between stops on the connecting piece, and wherein said hole is formed within the outer contour of said strip by said protrusion and the interior edge of said strip.

4. A windscreen wiper device according to claim 1, wherein said hole has an at least substantially U-shaped cross-section, and wherein said pins are arranged to block a longitudinal movement of said wiper blade relative to said strip in a longitudinal direction thereof towards said connecting pieces and away from said connecting pieces.

5. The windscreen wiper device according to claim 1, wherein said pins are pierced through said top portion of said wiper blade and into said wiper blade at the bottom of said groove.

6. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, said grooves being spaced below a top portion of said wiper blade, in which grooves spaced-apart longitudinal strips of the carrier element are disposed, wherein neighbouring ends of said longitudinal strips are interconnected by connecting pieces, which windscreen wiper device comprises a connecting device for an oscillating wiper arm, wherein said connecting pieces are made as separate pieces and are spaced longitudinally from said connecting device and comprise engaging members engaging around the longitudinal strips, so that said strips are mounted in grooves formed by said engaging members, wherein said strips and said connecting pieces are slidably connected by means of a snap connection, wherein at least one pin extends in a direction perpendicular to the windscreen to be wiped through said top portion of said wiper blade and through a hole in one of said longitudinal strips and engages into said wiper blade at a location of a bottom of said groove accommodating said strip, wherein said pin is arranged to block a longitudinal movement of said wiper blade relative to said strip in a longitudinal direction thereof away from one of said connecting pieces, and wherein said pin is located adjacent a terminal end of said elongated wiper blade, wherein said at least one pin is further defined as at least two pins, and wherein said pins are arranged to block a longitudinal movement of said wiper blade relative to said strips.

7. A windscreen wiper device according to claim 6, wherein said pins are separate constructional elements.

8. A windscreen wiper device according to claim 6, wherein said pins are interconnected by a transverse bridge.

9. A windscreen wiper device according to claim 8, wherein said pins and said transverse bridge are in one piece.

10. A windscreen wiper device according to claim 9, wherein said pins are U shaped.

11. A windscreen wiper device according to claim 10, wherein said pins are held by said connecting pieces.

12. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, said grooves being spaced below a top portion of said wiper blade, in which grooves spaced-apart longitudinal strips of the carrier element are disposed, wherein neighbouring ends of said longitudinal strips are interconnected by connecting pieces, which windscreen wiper device comprises a connecting device for an oscillating wiper arm, wherein said connecting pieces are made as separate pieces and are spaced longitudinally from said connecting device and comprise engaging members engaging around the longitudinal strips, so that said strips are mounted in grooves formed by said engaging members, wherein said strips and said connecting pieces are slidably connected by means of a snap connection, wherein at least one pin extends in a direction perpendicular to the windscreen to be wiped through said top portion of said wiper blade and through a hole in one of said longitudinal strips and engages into said wiper blade at a location of a bottom of said groove accommodating said strip, wherein said pin is arranged to block a longitudinal movement of said wiper blade relative to said strip in a longitudinal direction thereof away from one of said connecting pieces, and wherein said pin is located adjacent a terminal end of said elongated wiper blade, and wherein said at least one pin is covered by one of said connecting pieces.

* * * * *